Nov. 22, 1938.    F. G. WELKE    2,137,659
BEARING PACKER
Filed Nov. 23, 1936
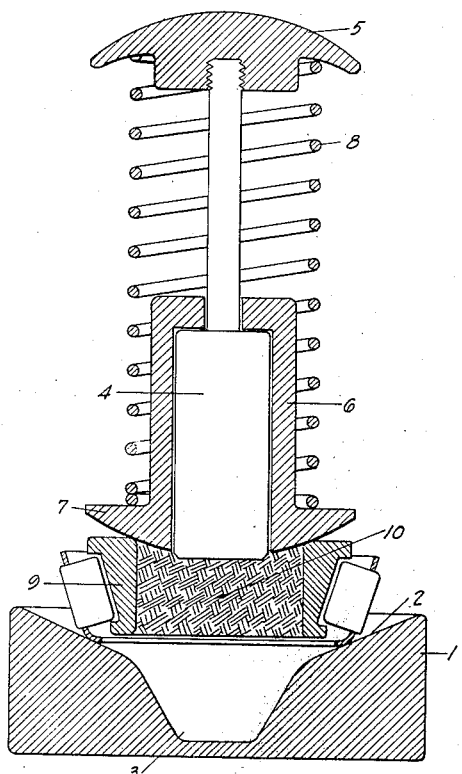
Fig. I.
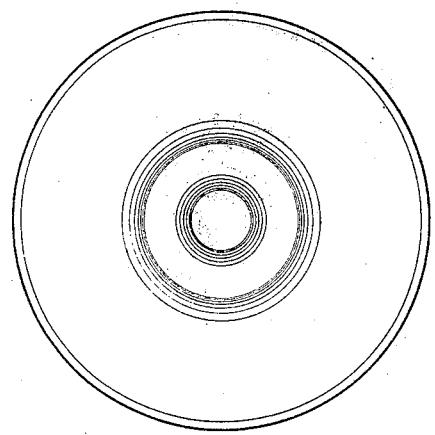
Fig. II.
Inventor: Ferdinand G. Welke
By his Attorney: H. Birch Patented Nov. 22, 1938

2,137,659

UNITED STATES PATENT OFFICE 2,137,659

BEARING PACKER

Ferdinand G. Welke, San Francisco, Calif., assignor to Shell Development Company, San Francisco, Calif., a corporation of Delaware Application November 23, 1936, Serial No. 112,245

4 Claims. (Cl. 184—1)

This invention relates to the art of lubricating bearings and in particular to a device for packing roller bearings, ball bearings and the like with a semi-solid lubricant.

As is well known, roller bearings consist of a hollow body in the form of a ring having equally spaced rollers held thereon by means of a retaining ring or cage. Ball bearings are often of similar construction, but have balls instead of rollers. In the past, it has been the practice to lubricate certain of these bearings by means of grease or semi-solid lubricant. The usual method has been to attempt to work this grease in between the body and the cage, but as will be apparent this can only be done ineffectively. In the case of automobile front wheel bearings, this has often resulted in damage owing to lack of lubricant under severe weather conditions. It has also been suggested to lubricate these bearings by means of various packers, but these have not proved entirely satisfactory.

It is a principal object of this invention to provide a simple device for forcing the lubricant into the space between the rollers of a roller bearing, or similar bearing.

The further objects and advantages of my invention will be apparent to those skilled in the art from the following detailed description of a specific embodiment of the invention throughout which reference is made to the accompanying drawing of which, Fig. I is an elevation partly in section of a preferred form of the device showing a roller bearing in position for servicing.

Fig. II is a plan view of the base shown in Fig. I. Referring to Fig. I, numeral 1 represents in general a base having an indented upper surface 2 having a centrally located well 3 the purpose of which will appear later herein. The upper part of the packer comprises a plunger 4 having a pad 5 at its upper end for the application of pressure. The plunger 4 is slidably mounted within a cylindrical guide 6 having a head 7 through the center of which the plunger 4 is free to pass upon a downward pressure being applied to the pad 5. A spring 8 is interposed between the pad 5 and the head 7 to hold the plunger normally within the guide or casing 6.

In operation a roller bearing 9 to which it is desired to apply lubricant is first thoroughly cleaned and then the central hole of the bearing 9 which normally fits tightly on a shaft is filled with the desired lubricant 10 and centrally placed on the surface 2 of the base 1. The plunger element is next placed upon the top of the bearing 9 as shown in Fig. I and downward pressure applied with the palm of the hand to the pad 5 at the upper end of the plunger 4. The plunger is of such size that it may pass through the hole in the bearing 9 containing the lubricant 10. By the downward pressure upon the plunger forcing the plunger into well 3 the lubricant 10 is displaced and is forced upward through the openings between the rollers, cage and body member of the roller bearing 9 as will be apparent to those skilled in the art. It should be noticed that the spring 8 is of sufficient strength to ensure that the bearing does not rise from the base upon the downward movement of the plunger 4.

By means of the well, smaller roller bearings in which the body protrudes more from the cage can be serviced, as the angle of the wall of the well is such that the cage is contacted instead of the body. It will be apparent that if the body of the bearing contacts the face 2 instead of the cage, no lubricant can reach the spaces between the rollers. The cage thus acts as a seal preventing the lubricant from being forced between the face 2 of the base and the roller bearing. The lower face of the head 7 is shaped to ensure contact with the rim of the central opening in the body of a bearing regardless of whether or not the operator positions the plunger and guide in an exactly vertical position over the bearing.

By means of the bearing packer described, it is possible to readily force lubricant of stiff consistency in between the rollers of the bearing in an expeditious manner. It is more economical to use my device than others on the market for the reason that different bearings can be serviced with different lubricants all with the same packer.

While I have shown a preferred embodiment of my invention, it should be understood that I may make variations thereof within the scope of the appended claims.

I claim as my invention:

1. A device for forcing lubricant between the body and cage of a bearing assembly having a central opening comprising: an indented seating member adapted to engage the cage of said bearing assembly, a plunger of less diameter than the central opening of said bearing, and a tubular guide for said plunger adapted to cover the central opening of said bearing assembly.

2. A device for forcing lubricant into the space between the body and cage of a hollow bearing assembly comprising an indented seating member adapted to engage the cage of said bearing assembly, a plunger adapted to pass through the central opening of said bearing assembly, a guide for said plunger adapted to cover the central opening of said bearing, and spring means normally holding said plunger within said guide.

3. A device for forcing lubricant into the space between the body and cage of a hollow bearing assembly comprising an indented seating member adapted to engage the cage of said bearing assembly, a plunger adapted to pass through the central opening of said bearing assembly, a tubular guide for said plunger, a head on said guide adapted to cover the central opening of said bearing and a spring normally holding said plunger within said guide.

4. A device for forcing lubricant into the space between the body and cage of a hollow bearing assembly comprising an indented seating member adapted to engage the cage of said bearing assembly, a plunger adapted to pass through the central opening of said bearing assembly, a guide for said plunger, a convex shaped head attached to said guide and adapted to cover the central opening of said bearing, and a spring normally holding said plunger within said guide.

FERDINAND G. WELKE.